United States Patent [19]

Osterlitz

[11] 4,354,087
[45] Oct. 12, 1982

[54] WELDING POWDER FEED DEVICE
[75] Inventor: Hermann Osterlitz, Lengede, Fed. Rep. of Germany
[73] Assignee: Salzgitter AG, Fed. Rep. of Germany
[21] Appl. No.: 186,210
[22] Filed: Sep. 11, 1980
[30] Foreign Application Priority Data
  Sep. 11, 1979 [DE] Fed. Rep. of Germany ....... 2936590
[51] Int. Cl.³ .............................................. B23K 9/18
[52] U.S. Cl. ................................ 219/73.2; 219/60 R; 219/125.11
[58] Field of Search ................ 219/73 R, 73.1, 73.11, 219/73.2, 73.21, 125.1, 125.11, 60 R

[56] References Cited
U.S. PATENT DOCUMENTS
2,598,076 5/1952 Smith .................................. 219/73.2
3,692,971 9/1972 Kniepkamp ....................... 219/73 R Primary Examiner—Elliot A. Goldberg
Attorney, Agent, or Firm—McGlew and Tuttle

[57] ABSTRACT

A combination for feeding welding powder from a welding tractor for arc welding over a vertical to horizontal curved surface includes a pivotable powder vessel and a mechanism for maintaining the vessel in a vertical position.

13 Claims, 2 Drawing Figures

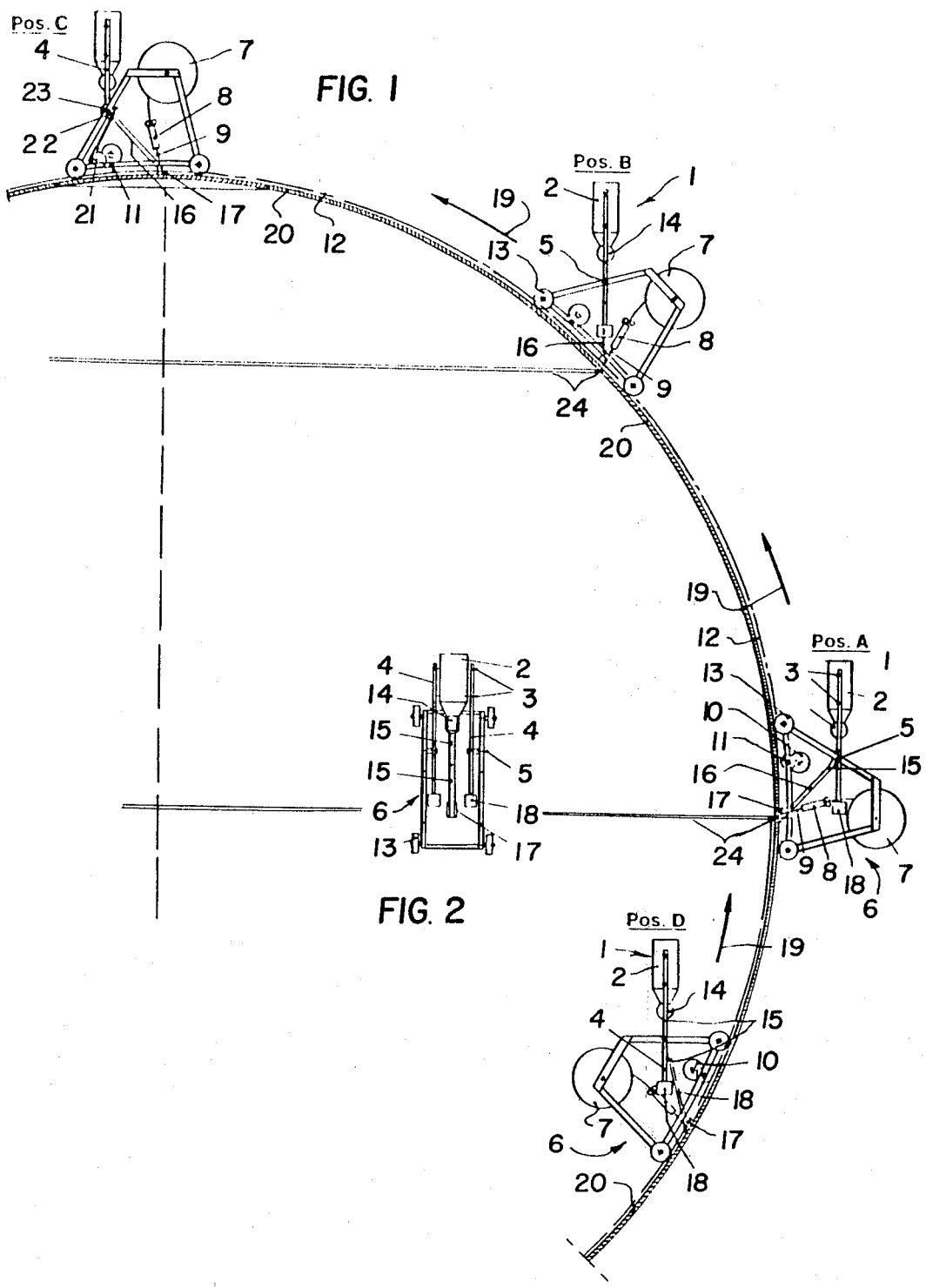

WELDING POWDER FEED DEVICE

FIELD AND BACKGROUND OF THE INVENTION

The invention relates to a feed device for granulated and powdery welding powders and additives on a welding tractor for arc welding on vertical to horizontal, curved surfaces using at least one welding powder vessel, as well as supply lines for powder application upon the weld zone and for covering the arc.

In a known use of endless base electrodes for arc welding under a powder seal endless bare electrodes which by means of a feed, are continuously advanced into the weld zone from a wire drum. The entire weld zone and the tips of the electrodes have to be covered with granulated or powdery weld powder and hidden from the surrounding atmosphere.

Obtaining the powder seal of the entire weld zone in arc welding on vertical and curved surfaces may be regarded as solved by the use of prior art devices disclosed, for example, by West German Pat. No. 930,939. To some degree, these known devices are suitable for the production of spherical large size vessels.

Despite the known state of the art, electrogas and electroslag welding useable, for example for manufacturing spherical pressure vessels is still not feasible, as the safe feeding of welding powder and metal powder is not assured. Difficulties in the automatic welding of the vessel jacket sections arise because the required uniform continuous powder supply cannot be effected with known welding machines due to the constant variation of the angle of inclination of the welding tractor in the production of vertical curved seams, from the vertical to the horizontal plane.

It is further known, for example, through West German Pat. No. 10 14 248, how to discharge welding powder by means of a partly evacuated vessel producing a suction effect. These known devices, however, are unsuitable for electrogas and electroslag welding for the reasons that, in the region of powder application in the weld zone, air from the atmopshere flows into the powder cover due to the existing pressure difference. Thereby, the powder cover is loosened up and the required tight powder scaling against the atmosphere is no longer ensured, owing to which considerable deficiencies in the weld seam quality are known to result.

SUMMARY OF THE INVENTION

The technical problem to be resolved by the present invention is the development of a feed device for granulated and powdery welding powders and additives on a welding tractor for arc welding vertical to horizontal curved surfaces, using at least one welding powder vessel as well as supply lines for powder application upon the weld zone and for covering the arc, by which the feed of the welding powder or metal powder, or both, can be achieved at any desired constant or constantly varying angle of inclination without loosening up the densely deposited welding powder in the weld zone.

To solve the problem posed, a feed device of the type described is designed with the following features according to the invention:

(a) at least one welding powder vessel mounted for pivoting about a horizontal axis on a welding tractor, with a metering device connected thereto, if provided, which vessel—independently of the angle of inclination of the welding tractor moving over the curved surfaces—is always held in vertical position;

(b) on each pivotably mounted welding powder vessel, or on the prometering device connected thereto, a flexible or articulate supply tube is disposed, which communicates with a powder applicator rigidly arranged on the welding tractor and surrounding the welding electrode.

Due to these measures, welding powder and also additives can be fed by gravity in any plane of inclination of the welding tractor smoothly, without additional means of transportation. It is thus possible to carry out the electroslag welding, for example, of vessel jacket sections in the manufacture of spherical presure vessels by means of a known welding tractor fully automatically both in vertical direction and in all planes of inclination. With the device according to the invention, of course, also horizontal curved welding seams on inclined surfaces can be produced in another application.

These and additional features of the invention will now be explained in greater detail by way of example with reference to the attached drawing.

Accordingly, it is an object of the invention to provide in combination with a welding tractor for arc welding on vertical to horizontal curved surfaces of the type having at least one welding powder vessel and supply lines for powder application upon a weld zone and for covering the arc, an improved feed device for feeding granulated and powdery welding powders and additives which includes means for mounting at least one welding powder vessel for pivoting about a horizontal axis on the welding tractor, means for holding the vessel such that the vessel is always held in the vertical position independently of the angle of inclination of the welding tractor moving over the curved surfaces, a supply conduit pivotably mounted on each welding vessel, a powder applicator in communication with the supply conduit for receiving welding powder, the powder applicator being rigidly arranged on the welding tractor and surrounding the welding electrodes for applying the powder upon the weld area.

It is a further object of the invention to provide an improved feed device for feeding granulated and powdery welding powders from a welding tractor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

FIG. 1 schematically illustrates the feed device on a welding tractor, when welding a spherical vessel, in four different positions; and FIG. 2 is a top view of the feed device in positon A.

DETAILED DESCRIPTION

FIG. 1 shows a spherical pressure vessel, whose jacket 20 consists of a plurality of sheet metal sections which are connected by means of a welding tractor 6, known in itself, by lengthwise and crosswise welding seams.

For the production of the weld seams extending from the bottom up, the welding tractor 6 running inside (Pos. D) or outside (Pos. A to B) is moved, for example from Pos. D on the vessel jacket 20 via Pos. A into Pos. B.

The welding tractor 6 is equipped in a known manner with a wire drum 7 and a wire advance device 8, by which the endless welding electrode 9 is continuously moved into the weld zone during the welding operation. The welding electrode 9 is surrounded by welding powder. The powder applicator 17, known per se is illustrated schematically, and a known powder return means which depends on the particular welding method is not shown in the drawing.

The drive of the welding tractor 6 for onward movement during the welding process is effected via a drive motor 10, a drive gear 11, which engages in a rack 12 secured on the vessel jacket 20 next to the weld seam.

The feed device 1 according to the invention, for feeding the welding powder is composed of a welding powder vessel 2, which is rigidly secured to guide arms 4 by means of screw or rivet connections 3. Of course, if needed, several powder vessels for different additives may be arranged on the guide arms 4. In the frame of the welding tractor 6, the guide arms 4 are mounted for swinging motion about a horizontal axis 5 and extend downwardly beyond horizontal axis 5. The ends of guide arms 4 are provided each with a counterweight 18. Thereby, the welding powder vessel 2 and also a metering device 14 disposed thereon, such as a cellular wheel lock, is always held in a vertical position, at any inclination, e.g. in the positions A, B, C, D, owing to which always a constant, continual welding powder supply to the welding zone is ensured. The welding powder vessel 2, or the metering device 14 connected thereto, is provided with a flexible supply tube 15, such as a hose length, which can be deflected laterally from its vertical position as shown in Pos. B through at least 45°. This is shown, for example, in Pos. A. The flexible supply tube 15 is connected to a feed pipe 16, rigidly disposed on the welding tractor 5, and the welding powder passing therethrough is fed into the powder applicator 17 for application upon the weld zone.

With the device according to the invention, welding powder can be supplied into the weld zone on vertical to horizontal curved surfaces in a trouble-free and satisfactory manner, so that in the manufacture of spherical vessels, for example, in the region from A to B, the electroslag welding can be done automatically in a single operation.

The lower half of a spherical vessel can be welded from the inside, as shown at D. Here, again, the vessel jacket 20 can be welded with the device according to the invention fully automatically, in a single operation, from a lower level to an upper level above the center of the vessel.

In contrast to the devices shown in positions A, B, D and in FIG. 2, where the welding powder vessel 2 is held in vertical position by a counterweight 18, the device shown in Pos C is designed with a different kind of adjustment of powder vessel 2. In this design, the powder vessel 2 is positively kept in vertical position by means of drive gear 11. Through a bench gear 21 and a worm gear 22, and with a reduction proportioned to the wedling tractor advance, gear 11 drives another gear 23 which is fixed to guide arms 4. For example, if welding tractor 6 moves from position A to C, gear 23 turns through 90°; a vertical position of the welding powder vessel is thus obtained at all angles of inclination between the positions A and C.

Instead of a flexible suply tube 15, an articulate conduit may be used, for example, a conduit jointed at the horizontal axis 5 of the pivotably mounted feed device 1.

In the inventive feed device 1 is useable not only for vertical curved weld seams, as described, but advantageously also for welding horizontal curved seams 24 at any level of the vessel. To this end the welding tractor 6 is guided over the seams 24 of vessel jacket 20 in a position turned through 90° relative to the showing in FIG. 1, while the horizontal axis 5 of the feed deivce 1 remains in the same position as shown in the individual positions A to D of FIG. 1.

To be able to use the feed device 1, according to the invention, for both vertical and horizontal weld seams, a further development of the invention provides that the horizontal axis 5 on tractor 6 can be swung by 90° relative to the travel direction 19.

Thus, in accordance with the invention, there is provided a feed device for feeding granulated and powdery welding powers and additives, mounted on a welding tractor for arc welding on vertical to horizontal curved surfaces using at least one welding powder vessel, as well as supply lines for powder application upon the weld zone and for covering the arc, characterized by at least one welding powder vessel mounted for pivoting about a horizontal axis 5 on a welding tractor in which the vessel 16, with a metering device 14, if provided, connected thereto, is always held in vertical position, independently of the angle of inclination of the welding tractor 16 moving over the curved surfaces. On each pivotally mounted welding powder vessel 2, or on the metering device 14 connected thereto, a flexible or articulate supply conduit 15 is disposed, which communicates with a powder applicator 17 rigidly arranged on the welding tractor 6 and surrounding the welding electrode 9.

The inventive feed device is further characterized in that the welding powder vessel 2 and/or several vessels 2 are brought into vertical position, by the effect of their own weight or by an additional weight 18.

The inventive feed device is still further characterized in that the adjustment of the vertical position of the welding powder vessel 2 is effected, through transmission parts 21, 22 and a gear 23 fixed to the guide arm 4, by corresponding rotation of the drive gear 23.

In each of the foregoing characterization of the inventive feed device, the flexible or articulated supply conduit 15 may be deflected through at least 90°. This arrangement may even still be further characterized by the flexible supply conduit 15 being a flexible hose section.

In the inventive feed device the supply conduit 15 may be a pivotably jointed pipe having a pivot axis aligned with the axis of rotation of the welding powder vessel.

A feed device according to the invention for welding curved seams extending from below upwardly, may be characterized by the horizontal axis 5 extending crosswise to the travel direction 19 of the tractor 6. The horizontal axis 5 extends substantially in the direction in which the welding of the seams 24 advances. The element embodying the horizontal axis 5 is mounted in the welding tractor 6 for pivoting about a vertical axis through 90° in the illustrated arrangement.

I claim:

1. In combination with a welding tractor for arc welding on vertical to horizontal curved surfaces of the type having a welding electrode, at least one welding powder vessel, and supply lines for powder application upon a weld zone and for covering the arc, an improved feed device for feeding granulated and powdery welding powders and additives comprising
   at least one welding powder vessel for pivoting about a horizontal axis on the welding tractor,
   means for holding the vessel such that the vessel is always held in a vertical position, independently of the angle of inclination of the welding tractor moving over the curved surfaces;
   a supply conduit pivotably mounted on each welding powder vessel, a powder applicator in communication with said supply conduit for receiving welding powder, and surrounding said powder applicator being rigidly arrangd on the welding tractor and surrounding the welding electrode for applying the powder upon the weld area.

2. The improved combination of claim 1 further comprising means for metering the powder passing through from said supply conduit from the powder vessel.

3. The improved combination of claim 1, wherein said holding means comprises a weight operatively connected to the vessel to pivot drive about the horizontal axis.

4. The improved combination of claim 1, wherein said supply conduit is flexible.

5. The improved combination of claim 1, wherein said supply conduit is arcuate.

6. The improved combination of claim 1, wherein said holding means comprises a guide arm connected to the powder vessel, drive means for rotatably driving the vessel into the vertical position and gear means interconnecting said guide arm to said drive means.

7. The combination of claim 4 or 5, wherein said supply conduit can be deflected through at least 90 degrees.

8. The combination of claim 4 wherein said flexible supply conduit is a flexible hose section 9. The combination of claim 1 or 2 or 3 wherein said supply conduit is a pivotably jointed pipe having pivot axis aligned with the axis of rotation of the welding powder vessel.

10. The combination of claim 1 or 2 or 3 wherein the horizontal axis extends crosswise to the travel direction of the tractor for welding curved seams extending from below upwardly.

11. The combination of claim 1 or 2 or 3 wherein the horizontal axis extends substantially in the direction in which the welding of the seams advances for welding approximately horizontal curved seams.

12. The combination of claim 10 further comprising an element embodying the horizontal axis mounted in the welding tractor for pivoting about a vertical axis through 90 degrees.

13. The combination of claim 11 further comprising an element embodying the horizontal axis mounted in the welding tractor for pivoting about a vertical axis through 90 degrees.

* * * * *